B. ROBINSON.
Wagon-Brake.

No. 214,456. Patented April 15, 1879.

Witnesses,
Franck L. Durand
J. J. McCarthy

Inventor,
Baler Robinson
By his Attorneys
Alexander Mason

UNITED STATES PATENT OFFICE.

BALER ROBINSON, OF IUKA, MISSISSIPPI.

IMPROVEMENT IN WAGON-BRAKES.

Specification forming part of Letters Patent No. 214,456, dated April 15, 1879; application filed November 18, 1878.

*To all whom it may concern:*

Be it known that I, BALER ROBINSON, of Iuka, in the county of Tishomingo, and in the State of Mississippi, have invented certain new and useful Improvements in Wagon-Brakes; and do hereby declare that the following is a full, clear, and exact description thereof, reference being had to the accompanying drawings, and to the letters of reference marked thereon, making a part of this specification.

The nature of my invention consists in the construction and arrangement of a wagon-brake, as will be hereinafter more fully set forth.

In order to enable others skilled in the art to which my invention appertains to make and use the same, I will now proceed to describe its construction and operation, referring to the annexed drawings, in which—

Figure 1:
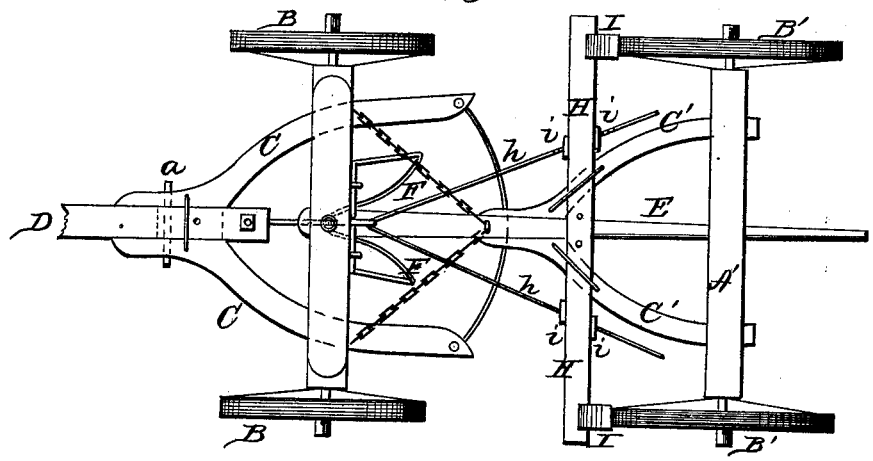
Figure 2:
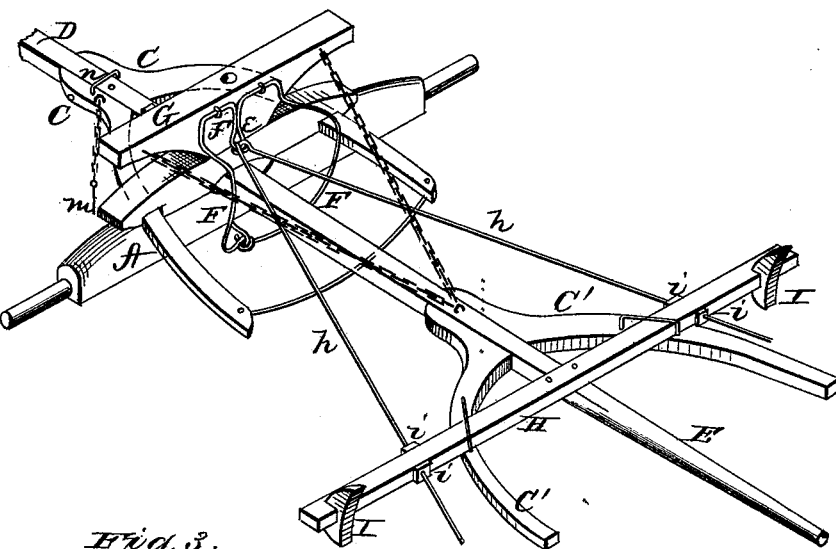
Figure 3:
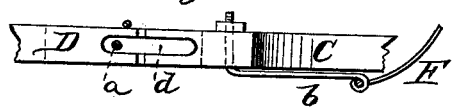

Figure 1 is a plan view, and Fig. 2 a perspective view, of the running-gear of a wagon with my brake applied thereto. Fig. 3 is a detailed view of a part thereof.

A represents the front axle, with wheels B B and hounds C C. A' is the rear axle, with wheels B' B'. E is the reach, with rear hounds, C' C', completing the running-gear of a wagon.

D is the tongue, attached between the front ends of the hounds C C by a bolt, $a$, which passes through a slot, $d$, in the tongue, as shown in Fig. 3, allowing the tongue a certain amount of forward and backward movement. To the rear end of the tongue D is attached a rod, $b$, which extends downward and then rearward under the front axle, and connects with two arms, F F, projecting rearward and downward from a rod, $f$, hung in suitable bearings on the rear side of the head-block G. In the center of the rod $f$ is a downwardly-projecting arm, $e$.

This rod $f$, with its arms $e$ and F F, may all be made of one piece, as shown in the drawings; or the rod may be separate, with the arms rigidly secured thereto.

From the center arm, $e$, extend two rods, $h$ $h$, which pass through the brake-bar H, having the shoes I I attached to it. Each rod $h$ has nuts $i\ i$, one on each side of the bar H, for the purpose of adjusting the brake to different-sized wagons, or according as the same wagon be lengthened or shortened.

It will readily be seen that in going down hill, or whenever the team holds back, the brake is applied, and as soon as the team pulls again the brake is relieved.

I also provide a pin, $m$, to be inserted in the tongue in front of a cross-bar, $n$, to make the tongue rigid and prevent any backward movement thereof when it is desired not to apply the brakes in backing the wagon.

Having thus fully described my invention, what I claim as new, and desire to secure by Letters Patent, is—

The combination, with the sliding tongue D, of the rod $b$, rod $f$, with arms F F and $e$, rods $h\ h$, with nuts $i\ i$, and the adjustable brake-bar H, with shoes I I, substantially as and for the purposes herein set forth.

In testimony that I claim the foregoing I have hereunto set my hand this 4th day of November, 1878.

BALER ROBINSON.

Witnesses:
 JAMES K. ALEXANDER,
 R. P. HODGE.